United States Patent
Liljedahl et al.

(10) Patent No.: US 12,416,924 B2
(45) Date of Patent: Sep. 16, 2025

(54) ROBOTIC WORK TOOL SYSTEM AND METHOD FOR DEFINING A WORKING AREA

(71) Applicant: HUSQVARNA AB, Huskvarna (SE)

(72) Inventors: Marcus Liljedahl, Huskvarna (SE); Jonas Rangsjö, Linköping (SE); Beppe Hellsin, Jönköping (SE); Fredrik Kallström, Huskvarna (SE); Andreas Peterson, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 268 days.

(21) Appl. No.: 17/918,776

(22) PCT Filed: Apr. 6, 2021

(86) PCT No.: PCT/EP2021/058846
§ 371 (c)(1),
(2) Date: Oct. 13, 2022

(87) PCT Pub. No.: WO2021/209277
PCT Pub. Date: Oct. 21, 2021

(65) Prior Publication Data
US 2023/0161357 A1    May 25, 2023

(30) Foreign Application Priority Data
Apr. 14, 2020  (SE) .................... 2050416-3

(51) Int. Cl.
*G05D 1/00* (2024.01)
*A01D 34/00* (2006.01)
*A01D 101/00* (2006.01)

(52) U.S. Cl.
CPC ......... *G05D 1/0274* (2013.01); *A01D 34/008* (2013.01); *A01D 2101/00* (2013.01)

(58) Field of Classification Search
CPC .. G05D 1/0278; G05D 1/0221; G05D 1/0274; G05D 1/0265; G05D 1/0272;
(Continued)

(56) References Cited

U.S. PATENT DOCUMENTS 9,142,063 B2    9/2015  Chen et al.
11,698,272 B2 *  7/2023  Kroepfl ............... C03C 17/3668
                                                      701/409
(Continued)

FOREIGN PATENT DOCUMENTS

EP    2437131 A1    4/2012
EP    3234718 B1    10/2018
(Continued)

OTHER PUBLICATIONS

Translation of WO-2019097626-A1 (Year: 2019).*
(Continued)

*Primary Examiner* — Adam R Mott
*Assistant Examiner* — James Miller Watts, III
(74) *Attorney, Agent, or Firm* — Burr & Forman

(57) ABSTRACT

A robotic work tool system (200) for defining a working area (105) in which at least one robotic work tool (100) subsequently is intended to operate. The system (200) comprises at least one controller (210) being configured to receive sensor data for pose estimation and event data relating to a plurality of events of at least one robotic work tool (100) moving within the working area (105). The received sensor and event data are associated with each other in time. The controller (210) is configured to determine positions for the events based on the received sensor data associated with the respective event data and to determine features reflecting the working area (105) by relating positions associated with corresponding events with each other. The controller (210) is configured to adjust the determined positions based on the
(Continued)

determined features by, for each feature, comparing the respective determined positions with each other; and determine, based on the adjusted positions, a map defining the working area (105).

15 Claims, 5 Drawing Sheets

(58) Field of Classification Search
CPC .......... G05D 1/027; G05D 1/246; G05D 1/43; A01D 2101/00; A01D 34/008; G01C 21/3859; G01C 21/3804; G01C 21/188; G01C 22/00; G01C 21/3848; G01C 21/3867; B25J 9/1664; Y10S 901/01
See application file for complete search history.

(56) References Cited

U.S. PATENT DOCUMENTS

| | | | |
|---|---|---|---|
| 2005/0182518 A1* | 8/2005 | Karlsson | G06V 10/84 |
| | | | 700/253 |
| 2010/0110412 A1* | 5/2010 | Basu | G01S 17/89 |
| | | | 356/3 |
| 2014/0005933 A1* | 1/2014 | Fong | G05D 1/0246 |
| | | | 701/447 |
| 2015/0197010 A1 | 7/2015 | Ruuspakka et al. | |
| 2016/0297070 A1* | 10/2016 | Reigo | B25J 9/1664 |
| 2017/0344020 A1* | 11/2017 | Mannefred | G06V 20/56 |
| 2017/0347521 A1 | 12/2017 | Tjernberg et al. | |
| 2018/0004217 A1* | 1/2018 | Biber | G05D 1/0274 |
| 2018/0306587 A1 | 10/2018 | Holz | |
| 2019/0004854 A1 | 1/2019 | Yang et al. | |
| 2019/0064817 A1* | 2/2019 | Schmitt | G06N 3/126 |
| 2019/0145775 A1* | 5/2019 | Cui | G01C 21/005 |
| | | | 701/446 |
| 2019/0212752 A1 | 7/2019 | Fong et al. | |
| 2019/0332114 A1* | 10/2019 | Moroniti | G01C 21/3807 |
| 2020/0275605 A1* | 9/2020 | Chen | G01S 19/53 |
| 2021/0093134 A1* | 4/2021 | Kim | A47L 9/009 |
| 2021/0138659 A1* | 5/2021 | Arora | G05D 1/6485 |
| 2022/0074762 A1* | 3/2022 | Artes | B25J 9/1664 |
| 2022/0358674 A1* | 11/2022 | Okada | G06T 7/246 |

FOREIGN PATENT DOCUMENTS

| | | | | |
|---|---|---|---|---|
| EP | 3633410 A1 | 4/2020 | | |
| JP | 2014222551 A | 11/2014 | | |
| JP | 2017107456 A | 6/2017 | | |
| JP | 2021535485 A | 12/2021 | | |
| WO | WO-9638770 A1 * | 12/1996 | | A01D 34/008 |
| WO | WO-2004059900 A2 * | 7/2004 | | G01C 21/12 |
| WO | 2014145996 A1 | 9/2014 | | |
| WO | 2016098040 A1 | 6/2016 | | |
| WO | WO-2019097626 A1 * | 5/2019 | | A47L 11/4011 |
| WO | 2019/167210 A1 | 9/2019 | | |
| WO | 2020033504 A2 | 2/2020 | | |
| WO | 2020041817 A1 | 3/2020 | | |

OTHER PUBLICATIONS

International Search Report and Written Opinion for International Application No. PCT/EP2021/058846 mailed Jun. 2, 2021.
Office Action and Search Report for Swedish Application No. 2050416-3 mailed on Nov. 18, 2020.

* cited by examiner

ROBOTIC WORK TOOL SYSTEM AND METHOD FOR DEFINING A WORKING AREA

TECHNICAL FIELD

The present disclosure relates to a robotic work tool system as well as a method for defining a working area in which a robotic work tool is subsequently intended to operate.

BACKGROUND

A robotic work tool is an autonomous robot apparatus that is used to perform certain tasks, for example cutting lawn grass, demolish an area or cleaning a floor. A robotic work tool is generally controlled by defining an area, hereinafter referred to as a working area, in which the robotic work tool is intended to operate. The working area is defined by a perimeter enclosing the working area. The perimeter includes borders, or boundaries, which the robotic work tool is not intended to cross. The robotic work tool is typically configured to work in a random pattern inside the working area.

A robotic work tool is generally not aware of the design, or the size, of the working area in which it is intended to operate. The robotic work tool is typically configured to move within the working area until the robotic work tool encounters a border, perimeter, or obstacle, of the working area. Then, the robotic work tool is configured to make a turn and continue moving in another direction until a new border, perimeter, or obstacle, is encountered. Even if this generally provides a robotic work tool that operates within the working area in a sufficiently efficient manner, the inventors have realized that the robotic work tool may operate within the working area in an even more efficient way if knowledge of the design and the size of the area may be utilized.

SUMMARY

With the introduction of communicating devices within robotic work tool systems, the possibilities for what a robotic work tool system may perform have expanded. By utilizing different devices to perform different tasks within a robotic work tool system, devices may be specialized at different things. For example, not all devices included in a robotic work tool system need to have heavy processing capabilities. A first device may be designed for collecting data and communicating the collected data to a second device. The second device may process the received data and thereafter communicate the result of the processing back to the first device. The first device may thereafter use the received result for its continued operation. Thus, different devices may be combined into one system, where each device may be specialised at different things, such that an improved system with greater capabilities is created.

The inventors of the various embodiments have realized, after inventive and insightful reasoning, that it may be possible to use communicatively coupled devices within a robotic work tool system in order to achieve knowledge of the design and the size of a working areas. By achieving this knowledge, the working area may be more accurately defined and the robotic work tool may operate within the working area in a more efficient way. As the robotic work tool system has more knowledge of the working area, the robotic work tool system may more accurately reflect the working area in an improved map. With improved maps, better decisions may be taken concerning subsequent actions to perform within the working area.

In view of the above, it is therefore a general object of the aspects and embodiments described throughout this disclosure to provide a robotic work tool system that reflects a working area, in which a robotic work tool is subsequently intended to operate, in an improved way.

This general object has been addressed by the appended independent claims. Advantageous embodiments are defined in the appended dependent claims.

According to a first aspect, there is provided a robotic work tool system for defining a working area in which at least one robotic work tool is intended to operate.

In one exemplary embodiment, the robotic work tool system comprises at least controller. The at least one controller is configured to receive sensor data for pose estimation and event data relating to a plurality of events of at least one robotic work tool moving within the working area. The received sensor data and event data are associated with each other in time. The at least one controller is further configured to determine positions for the plurality of events based on the received sensor data associated with the respective event data. Thereafter, the at least one controller is configured to determine features reflecting the working area by relating positions associated with corresponding events with each other and to adjust the determined positions based on the determined features by, for each determined feature, comparing the respective determined positions with each other. The at least one controller is configured to determine, based on the adjusted positions of the determined features, a map defining the working area.

In one embodiment, the sensor data and the event data are received from the at least one robotic work tool moving within the working area.

In one embodiment, the at least one controller is further configured to control, based on the determined map, an operation of the at least one robotic work tool when operating within the working area. The at least one controller may be configured to control the operation of the at least one robotic work tool by determine, based on the determined map relating to the working area, a travel path within the working area which the at least one robotic work tool is intended to follow when operating within the working area.

In one embodiment, the at least one controller is further configured to transmit the determined map and/or the travel path to at least one of the robotic work tool and a visualization unit.

In one embodiment, the at least one controller is configured to adjust the positions of the determined features by finding outliers of the determined positions and removing the found outliers from the determined positions of the determined feature.

In one embodiment, the at least one controller is configured to adjust the determined positions of the determined features by bias estimation.

In one embodiment, the received sensor data for pose estimation comprises at least one of position data, IMU data and odometry data.

In one embodiment, the event data relating to the events of the robotic work tool comprises loop events, timer events and state events.

In one embodiment, the at least one controller is configured to determine features reflecting the working area by categorize, based on the received event data, the determined positions into different categories; and for each category, add the determined positions into a feature map, wherein the feature map corresponds to the respective feature.

In one embodiment, prior to determine the map relating to the working area, the at least one controller is further configured to determine features reflecting the working area by relating the adjusted positions with each other based on the associated event data; and to adjust the determined positions of based on the determined features by, for each determined feature, comparing the respective determined positions with each other.

In one embodiment, the robotic work tool system comprises the robotic work tool. The robotic work tool may be a robotic lawn mower.

In one embodiment, the robotic work tool system comprises a visualization unit and the visualization unit is configured to display the determined map relating to the working area. The visualization unit may be configured to receive user input from a user during the user's operation and interaction with said visualization unit, wherein the at least one controller may be configured to adjust the map relating to the working area based on the received user input.

According to a second aspect, there is provided a method implemented by the robotic work tool system according to the first aspect.

In one exemplary implementation, the method is performed by a robotic work tool system for defining a working area in which at least one robotic work tool subsequently is intended to operate. The method comprises receiving sensor data for pose estimation and event data relating to a plurality of events of at least one robotic work tool moving within the working area. The received sensor data and event data are associated with each other in time. The method further comprises determining positions for the plurality of events based on the received sensor data associated with the respective event data and determining features reflecting the working area by relating positions associated with corresponding events with each other. Thereafter, the method comprises adjusting the positions of the determined features by, for each determined feature, comparing the respective determined positions with each other and determining, based on the adjusted positions of the determined features, a map defining the working area.

In some embodiments, the method further comprises controlling, based on the determined map, an operation of the at least one robotic work tool when operating within the working area. The step of controlling an operation of the at least one robotic work tool may further comprise determining, based on the determined map defining the working area, a travel path within the working area which the at least one robotic work tool is intended to follow when operating within the working area.

In some embodiments, the method further comprises transmitting the determined map and/or the travel path to at least one of the robotic work tool and a visualization unit.

In some embodiments, the step of adjusting the positions of the determined features comprises finding outliers of the determined positions; and removing the found outliers from the determined positions of the determined feature.

In some embodiments, the step of adjusting the positions of the determined features comprises performing a bias estimation.

In some embodiments, the received sensor data for pose estimation comprises at least position data, IMU data and or odometry data.

In some embodiments, the event data relating to the events of the robotic work tool comprises loop events, timer events and state events.

In some embodiments, the step of determining features reflecting the working area further comprises categorizing, based on the received event data, the determined positions into different categories; and for each category, adding the determined positions into a feature map, wherein the feature map corresponds to the respective feature.

In some embodiments, prior to determining the map relating to the working area, the method further comprises determining updated features reflecting the working area by relating the adjusted positions with each other based on the associated event data; and adjusting the positions of the determined features by, for each determined feature, comparing the respective determined positions with each other.

Some of the above embodiments eliminate or at least reduce the problems discussed above. By processing data relating to pose and events of a robotic work tool, features reflecting a working area may be determined. Based on the determined features, the positions for the events may be adjusted such that they are more accurately determined. The adjusted positions may be used when determining maps defining the working area. Thus, a robotic work tool system and method are provided that improves maps defining the working area in which a robotic work tool is subsequently intended to operate.

BRIEF DESCRIPTION OF DRAWINGS

These and other aspects, features and advantages will be apparent and elucidated from the following description of various embodiments, reference being made to the accompanying drawings, in which.

DETAILED DESCRIPTION

The disclosed embodiments will now be described more fully hereinafter with reference to the accompanying drawings, in which certain embodiments of the robotic work tool system are shown. This robotic work tool system may, however, be embodied in many different forms and should not be construed as limited to the embodiments set forth herein; rather, these embodiments are provided by way of example so that this disclosure will be thorough and complete, and will fully convey the scope of the robotic work tool system to those skilled in the art. Like numbers refer to like elements throughout.

Figure 1:
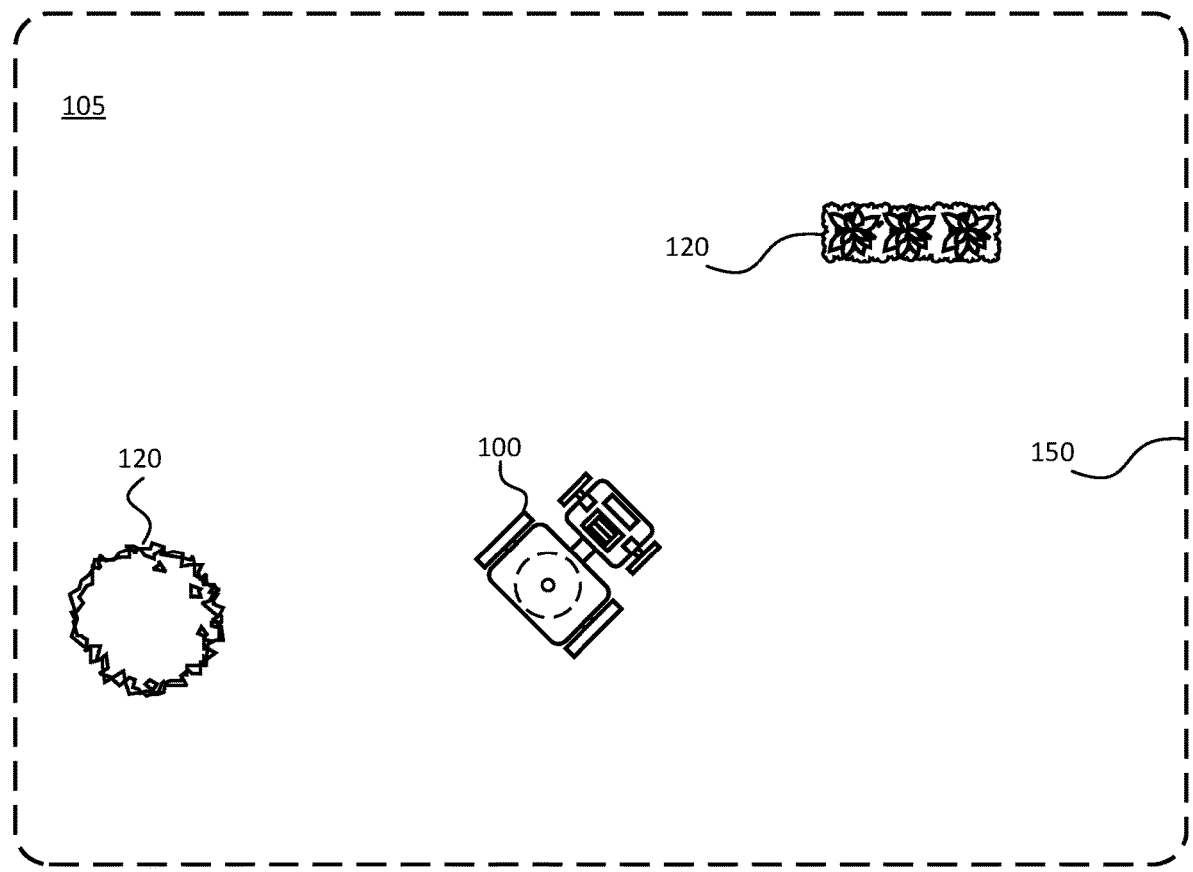
FIG. 1 shows a schematic overview of a robotic work tool in a working area.

In one of its aspects, the disclosure presented herein concerns a robotic work tool system for defining a working area in which at least one robotic work tool subsequently is intended to operate. FIG. 1 illustrates a schematic view of a robotic work tool 100 in such a working area 105. As will be appreciated, the schematic view is not to scale. If the working area 105 is a lawn and the robotic work tool 100 is a robotic lawn mower, the working area 105 is the area to be mowed by the robotic work tool 100. As seen in FIG. 1, the working area 105 is surrounded by a working area perimeter 150, which sets the boundaries for the working area 105, i.e. defines the boundaries for the working area 105. The robotic work tool 100 is intended to operate within the working area 105 and remain within this area due to the defined working area perimeter 150. By defining the working area perimeter 150, the robotic work tool 100 will not cross the perimeter and only operate within the enclosed area, i.e. the working area 105. By defining the working area 105, the robotic work tool system will have knowledge about the working area perimeter 150 and the area within the working area perimeter 150.

As seen in FIG. 1, trees and flowerbeds may be located within the working area 105. These objects cover parts of the working area 105 that the robotic work tool 100 cannot, or should not, operate. Even if the objects in FIG. 1 are illustrated as a bush and a flowerbed, other obstacles and objects may also be located within the working area 105. Examples of such objects may be paths, bushes, tool sheds, ponds etc. These objects, or rather the areas covered by these objects, may be called stay-out areas 120. A stay-out area 120 is an area that is to be excluded from the working area 105 which the robotic work tool 100 should operates. Stay-out areas 120 may be used to protect, for example, flowerbeds and bushes, or to prevent the robotic work tool 100 to travel into restricted areas such as ponds and areas that may damage the robotic work tool 100. Thus, stay-out areas 120 are areas within the working area 105 that for different reasons should not be entered by a robotic work tool 100. Thus, when defining the working area 105, it is important that also all obstacles, or stay-out areas, are covered in order for the working area 105 to be accurately defined.

Figure 2:
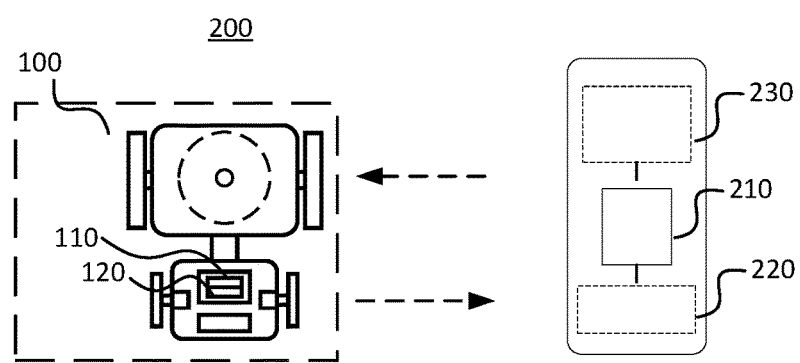
FIG. 2 shows a schematic view of a robotic work tool system.

The present disclosure is now going to be described with reference to FIG. 2. FIG. 2 illustrates a robotic work tool system 200. The robotic work tool system 200 comprises at least one controller 210. As may be appreciated, the robotic work tool system 200 may comprise a plurality of controllers 210 communicatively coupled to each other. By combining a plurality of controllers 210, even higher processing power may be achieved.

The robotic work tool system 200 will mainly be described in general terms of a robotic work tool system 200 defining a working area 105 in which at least one robotic work tool 100 subsequently is intended to operate, such as a lawn. However, it should be understood that the robotic work tool system 200 described herein may be implemented together with any type of autonomous machine that may perform a desired activity within a desired working area. Examples of such types of autonomous machines include, without limitation, cleaning robotic work tools, polishing work tools, repair work tools, surface-processing work tools (for indoors and/or outdoors), and/or demolition work tool or the like.

As illustrated in FIG. 2, the at least one controller 210 may be communicatively coupled to a robotic work tool 100 by a wireless communication interface. Additionally, or alternatively, the wireless communication interface may be used to communicate with other devices, such as servers, personal computers or smartphones, charging stations, remote controls, other robotic work tools or any remote device, which comprises a wireless communication interface and a controller. Examples of such wireless communication are Bluetooth®, Global System Mobile (GSM), Long Term Evolution (LTE) and 5G or New Radio (5G NR), to name a few. In some embodiments, the robotic work tool system 200 may comprise the robotic work tool 100. In one advantageous embodiment, the robotic work tool 100 may be a robotic lawn mower.

In one embodiment, the at least one controller 210 is embodied as software, e.g. remotely in a cloud-based solution. In another embodiment, the at least one controller 210 may be embodied as a hardware controller. The at least one controller 210 may be implemented using any suitable, publicly available processor, computing means, virtual computer, cloud computer or Programmable Logic Circuit (PLC). The at least one controller 210 may be implemented using instructions that enable hardware functionality, for example, by using executable computer program instructions in a general-purpose or special-purpose processor that may be stored on a computer readable storage medium (disk, memory etc.) to be executed by such a processor. The controller 210 may be configured to read instructions from a memory 220 and execute these instructions to define a working area in which at least one robotic work tool subsequently is intended to operate. The memory may be implemented using any commonly known technology for computer-readable memories such as ROM, RAM, SRAM, DRAM, FLASH, DDR, SDRAM or some other memory technology.

A first embodiment according to the first aspect will now be described. The at least one controller 210 is configured to receive sensor data for pose estimation and event data relating to a plurality of events of at least one robotic work tool 100 moving within the working area 105. The received sensor data and event data are associated with each other in time. The sensor data and the event data may be received from at least one robotic work tool 100 moving within the working area 105. In case the working area 105 is a very large area, it may be advantageous to receive sensor data and event data of a plurality of robotic work tools 100. This may reduce the time needed to define the working area 105.

Sensor data for pose estimation may be any data that can used to estimate pose of the at least one robotic work tool 100. Pose relates to position and/or orientation of the at least one robotic work tool 100 and thus, the sensor data may be any data that can be used for estimating pose of the at least one robotic work tool 100. Exterior orientation and translation may be used interchangeably to refer to the pose of the robotic work tool 100. The sensor data may comprise at least one of position data, Inertial Measurement Unit (IMU) data, and odometry data. Thus, by receiving sensor data for pose estimation, a position of the at least one robotic work tool 100 may be determined.

Event data relating to events of the robotic work tool 100 is data that may be associated with a certain action related to the robotic work tool 100. Event data originates from at least one sensor of the at least one robotic work tool 100. Event data may comprise, for example, loop events, timer events, lift events, collision events, GNSS events, Real Time Kinematic (RTK) events and state events. Loop events, interchangeably referred to as boundary events, refer to events when the robotic work tool 100 passes a loop wire, i.e. a boundary wire. State events, interchangeably referred to status events, refer to events when status of the robotic work tool 100 changes. Examples of such events may be the change from charging to non-charging, stops and errors. Collision events refer to events when a collision happens, i.e. if the robotic work tool 100 collides with an object such as a tree, stone or such. Thus, a collision event may occur when the at least one robotic work tool 100 enters into a stay-out area 120. Lift events refer to events when the robotic work tool 100 is lifted from the ground. Timer events may be based on Global Navigation Satellite System (GNSS) events and may be sent, for example, on every third GNSS event, which may be every third second. When the at least one robotic work tool 100 is charging, timer events may be sent less frequently, for example only every fifth minute. RTK events refer to events when RTK GNSS events happen.

After the at least controller 210 has received sensor data and event data, the at least one controller 210 is configured to determine positions for the plurality of events based on the received sensor data associated with the respective event data. The at least one controller 210 is configured to determine features reflecting the working area 105 by relating positions associated with corresponding events with each other. Thereafter, the at least one controller 210 is configured to adjust the determined positions based on the determined features by, for each determined feature, comparing the respective determined positions with each other. The at least one controller 210 is thereafter configured to determine, based on the adjusted positions of the determined features, a map defining the working area 105.

Thus, the above described robotic work tool system 200 receives sensor data originating from at least one robotic work tool 100 moving within an area, for which a map is going to be determined. As the map is determined based on data received from the actual area, the reliability of the map may be ensured. The at least one controller 210 processes the received data and based on the result from the processing, a map with a high accuracy is determined. By processing data relating to poses and events of a robotic work tool 100, features reflecting a working area 105 may be determined. Based on the determined features, the positions for the events may be adjusted such that the positions are more accurately determined. The adjusted positions may be used when determining maps defining the working area 105. Thus, the provided robotic work tool system 200 may provide reliable maps defining a working area 105 with a high accuracy, in a cost efficient way. By introducing the above proposed robotic work tool system 200, the previously described disadvantages are eliminated or at least reduced. With the provided robotic work tool system 200, the received data is processed in a way that may achieve a higher accuracy of the map of the working area 105, based on relatively simple data.

In one embodiment, the received sensor data for pose estimation may comprise at least one of position data, IMU data and odometry data. The at least one controller 210 may be configured to determine the positions for the plurality of events by first determining a heading of the at least one robotic work tool 100. The heading of the robotic work tool 100 may be determined based on at least one of the received position data, IMU data and odometry data received from the respective at least one robotic work tool 100. Thereafter, the positions of the at least one robotic work tool 100 may be determined based on received odometry data and the determined heading of the at least one robotic work tool 100. The determined positions of the at least one robotic work tool 100 may be associated with the respective event data. In this way, optimized positions of the plurality of events may be determined as uncertainties and errors relating to the sensor data may be reduced.

According to one example embodiment in accordance with the previously described embodiment, heading of motion, and an accuracy related to it, may be received by the at least one controller 210. The data may be originating from a GNSS module of at least one robotic work tool 100. This received data is not necessarily the same as the heading of the robotic work tool 100, but when the robotic work tool 100 is moving forward they should be the same. Furthermore, received IMU data of the same at least one robotic work tool 100 may report a yaw value, which may have drift and no knowledge of absolute heading. The IMU of the at least one robotic work tool 100 may have a run-time calibration, which will cancel out most of the drift. The calibration may take place when the received data indicates that the IMU is not moving. The offset of the IMU may be estimated by modelling the offset as a piece wise linear (PWL) function.

Figure 3:
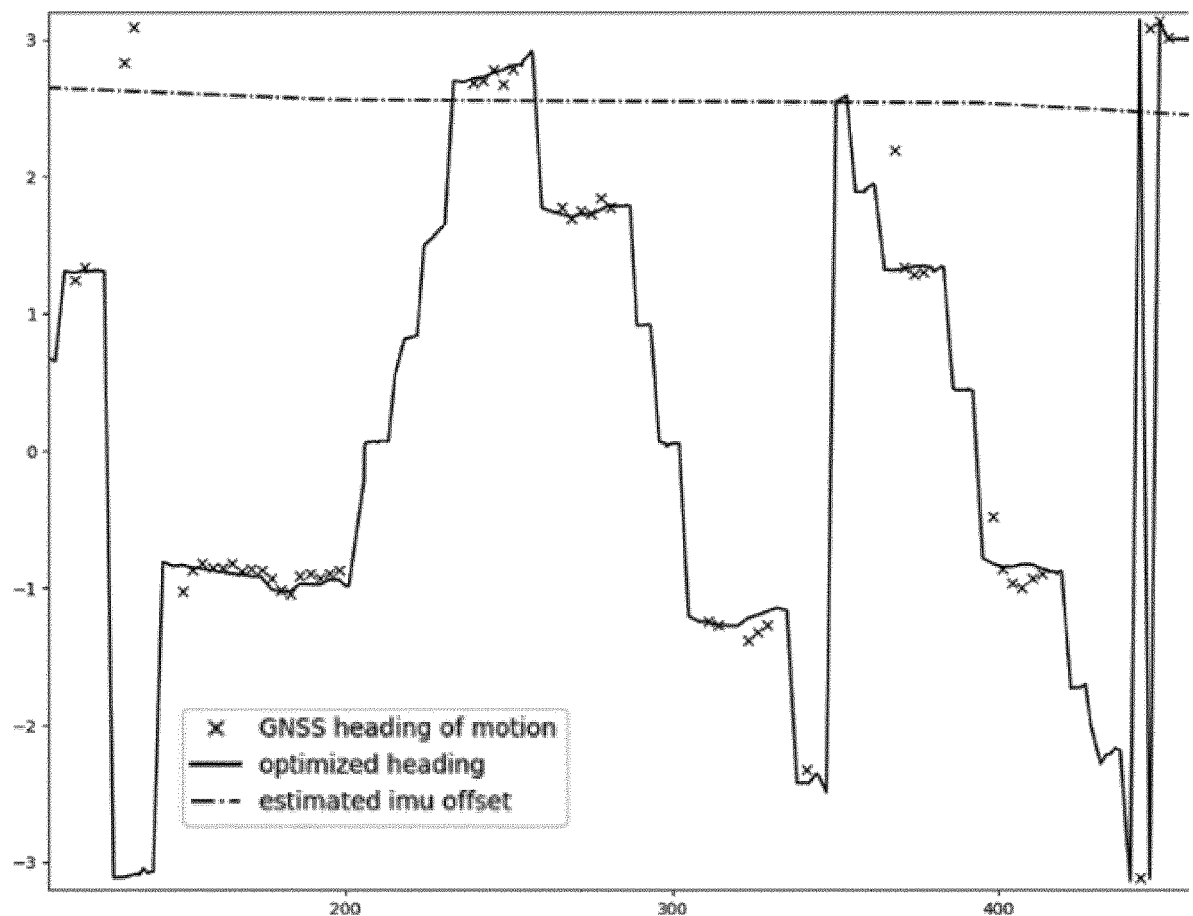
FIG. 3 illustrates an example of processed data.

In a first step, the received data may be divided into smaller sets of data. When a large time gap in the received data may be detected, a new set of data will be created. The time gap may be, for example, approximately 30 seconds. Thereafter, it may be detected when the robotic work tool 100 is still. This data may be handled separately as it may be assumed that the heading will not change during those periods. In a second step, a gyro drift of the IMU may be compared with a wheel odometry heading. If there is a large deviation between these two, it may be assumed that the IMU is not calibrated and a base drift may be calculated. Thereafter, a pre-estimate using a Kalman filter may be performed. The output from the Kalman filter may then be fed into a least square minimizer giving the final drift of the gyro. Finally, the heading of the robotic work tool 100 may be calculated by adding the drift to the gyro. FIG. 3 illustrates an example of the output of the heading optimizer as well as input data.

Thereafter, the positions of the at least one robotic work tool 100 may be determined by fusing the determined heading of the at least one robotic work tool 100 with received odometry data. For each data point, odometry x data, y data and heading may be received. In a first step, a delta movement may be determined based on this data. The delta movements reference frame may be translated to the robotic work tool 100, instead of a global frame. The delta x movement is a movement in the direction of the robotic work tool 100, and the delta y movement is a movement sideways for the robotic work tool 100. As previously described, the received data may be divided into smaller data sets by finding larger time step in the data. Thereafter, the delta odometry data may be recalculated to the global frame by using the previously determined heading. The delta odometry data may be fused with a weighted GNSS value. The result of this is optimized positions, which may remove GNSS noise. The determined optimized positions may thereafter be associated with the respective event data.

As previously described, the at least one controller 210 is further configured to determine features reflecting the working area 105 by relating positions associated with corresponding events with each other. Thus, all positions, or at least a major part of the positions, that are related to a certain event, may be associated with each other. A feature may be described as a property of the working area 105. Examples of so-called features are map features, loop features, charging station features, collision cluster features and gradient features. For example, map features may reflect the contours of the boundary of the working area 105 and obstacles inside the working area 105, such as stay-out areas 120 and the flowerbed in FIG. 1. The boundary and obstacles within the working area 105 may be translated into the map by using collisions and wire passages made by the at least one robotic work tool 100, which is moving within the working area 105. The map features may also find guide wires.

In one example embodiment, the at least one controller 210 may be configured to determine features reflecting the working area 105 by categorizing, based on the received event data, the determined positions into different categories. For example, the determined positions may be categorized into collisions, loop passages and timer points. Points where the at least one robotic work tool 100 is not moving may be filtered out. Points with a low accuracy may also be filtered out. Thereafter, the at least one controller 210 may be configured to, for each category, add the determined positions into a feature map. Thus, feature maps may be created for each category. The feature map corresponds to the respective feature and compiles information of a certain feature in a suitable format. The feature map may, according to one embodiment, be described as a matrix of x, y and z positions. The feature map may be, for example, a bitmap. Alternatively, the feature map may be a vector map, or a vectorised information image.

The at least one controller 210 may be configured to add the determined positions into the feature map in different ways. According to one example embodiment, the at least one controller 210 may be configured to add the determined positions into the feature map by adding a 2-dimensional Gauss-function at each determined position. This may be performed with a determined resolution. The number of feature maps may depend on available event data, but according to one example embodiment, four feature maps may be created. These four feature maps may be a timer map, a collision map, a loop map and a boundary map, wherein the boundary map is the sum of the collision and the loop map. The created feature maps may relate to one type of sensor data, but may also be a combination of multiple sensor data. For some categories of sensor data, a 2-dimensional feature map, or image, may be created as a sum of 2-dimensional radial basis functions related to the position. Alternatively, the 2-dimensional feature map, or image, may be created as a sum of any 2-dimensional function that can be summed into a feature map, or image. For some categories of sensor data, or combination of sensor data, where a fused value is a real-valued sensor value, a feature map that reflects the value, or the fused value, at each position in the feature map, or image, may be created. Alternatively, for some categories of sensor data, or combination of sensor data, where the fused value is a complex-valued value or vector, a bit that reflects that complex value or vector at each position in the bitmap/image may be created.

Thereafter, regardless of how the determined positions have been added into the feature maps, the at least one controller 210 may be configured to refine the feature map using filters, or algorithms, to determine the respective features reflecting the working area 105. This may be done in several different ways and in different combinations, and the examples described hereinafter are not limiting in any way. The example described herein merely illustrate examples of filters and combinations.

According to one example embodiment, a Gaussian filter may be run on a determined timer map, which may be used as a normalization filter on the other maps. The normalization filter may amplify areas where the at least one robotic work tool 100 has not been as often. A Sobel filter on the timer map may be used to create a Sobel map. As known in the art, a Sobel filter may be used to create an image emphasising edges. The collision map, the loop map and the boundary map may alternatively, or additionally, be created based on complex Gaussians. The magnitude of the Gaussian may be $e^{(1j\ theta)}$, where theta is the heading of the at least one robotic work tool 100. By using this approach, narrow passages may be better detected in the maps.

When the maps are generated, where each map corresponds to a respective feature of the working area 105, the boundary and obstacles may be found. A timer map may be good for a robust inside and outside detection of the working area 105. By looking at the magnitude, a rough estimate of the inside and the outside may be performed. As described above, a Sobel map may be good at finding edges, it is robust but with low precision. A boundary map may give better precision than a Sobel maps, but may be less robust. A complex boundary map may be better on narrow passages than a boundary map. Collision and loop events maps may be used to find obstacles within the working area 105.

According to one example embodiment, a Watershed filter may be used on the boundary and Sobel maps to find the inside of the working area 105. Watershed is a classical algorithm used for segmentation, that is, for separating different objects in an image. Before the Watershed filter may be applied, markers defining inside and outside areas are found. First, minimum peaks may be found in the Sobel map. Minimum peaks in the Sobel map may normally present points far away from the boundary, both inside or outside of the working area 105. Peaks where the timer map is lower than 5% of its max value may be kept and marked as outside and peaks that are higher than 20% of the max value may be kept and marked as inside. The edge of the map, i.e. the edge of the working area 105, may also be marked as outside. The markers and the Sobel map may be fed into a Watershed algorithm and a first estimate of the boundary may be found. This estimate may then be filtered in a skeletonize algorithm. As known in the art, a skeletonize algorithm may be used to emphasize geometrical and topological properties of a shape, such as its connectivity, topology, length, direction, and width. The skeletonize algorithm may be used for both the inside area and the outside area of the working area 105. For smaller objects, such as loop obstacles, collision obstacles and boundary obstacles, all maximum peaks may be found in the different maps. The maximum peaks may be used as input to a Watershed algorithm and thereafter with a Sobel filter. This may give a good estimate of the shape and size of the obstacles of the working area 105. By using a Sobel filter, the edge of the obstacle 120 may be set to where the Sobel filter gives maximum value. The feature maps may also be used to find guide wires within the working area 105.

The step of refining the feature map using filters to determine the respective features reflecting the working area 105 may according to one embodiment comprise four steps. The first step comprises finding robust inside and outside by level-filter on the timer map. The second step comprises running a Watershed algorithm on the Sobel map and use result from the first step as input. The third step comprises running a skeletonize algorithm on the result from the second step. This may be used as input to the next step, i.e. the fourth step. The fourth step comprises running a Watershed algorithm on the complex events map.

Figure 4:
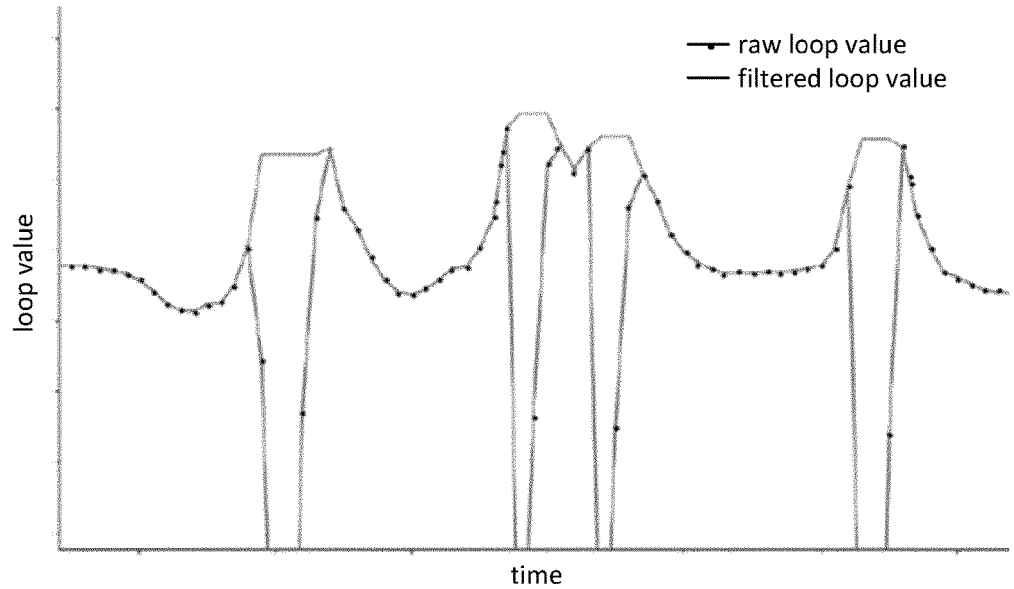
FIG. 4 illustrates an example of raw loop values and filtered loop values.

The aim of the loop feature map is to create a map of the loop values over the working area 105. The loop values may typically be quite flat over the working area 105, except at the edges of the boundary wire. At the edges, the loop values may be changing rapidly from the highest value down to negative. The first step may therefore be to identify loop wire passages and remove parts close to the wire passages with high derivative. The parts with high derivative may be replaced with a value coming from the peak follower. An example of raw loop values and filtered loop values is shown in FIG. 4. A loop filter may be applied and a Gaussian map may be created. For this map, the level may be linearly scaled between 0 and pi and used as a complex level to each Gaussian. After the map is created, the reverse process of mapping the values back from 0 to pi to loop values may be performed. The map thereafter comprises estimated loop values all over the working area 105, except at the edges where the loop filter is applied.

Regardless of how the features have been determined, the at least one controller 210 may thereafter be configured to, based on the determined features, adjust the determined positions by, for each determined feature, comparing the respective determined position with each other. Thus, the determined positions of the at least one robotic work tool 100 may be adjusted in accordance with the positions for the determined features. The positions for the respective features may be compared with each other, and, for example, a statistical analysis may be performed to determine which positions that may be adjusted. Two embodiments for adjusting the determined positions are going to be described below.

In one embodiment, the at least one controller 210 may be configured to adjust the positions of the determined features by finding outliers of the determined positions and removing the found outliers from the determined positions of the determined feature. An outlier is a data point that differs significantly from other observations and the outliers may be found in different ways. Examples of methods that may be used for finding outliers may be RANSAC (RANdom SAmple Consensus) methods. As known in the art, RANSAC is an iterative method to estimate parameters of a mathematical model from a set of observed data that contains outliers, when outliers are to be accorded no influence on the values of the estimates. Therefore, RANSAC may also be interpreted as an outlier detection method. Other examples of methods for finding outliers may be MSAC (M-estimator SAmple and Consensus), MLESAC (Maximum Likelihood Estimation SAmple and Consensus), MAPSAC (Maximum A Posterior Sample Consensus) and KALMANSAC.

In another embodiment, the at least one controller 210 may be configured to adjust the determined positions of the determined features by bias estimation. According to this embodiment, after all features have been determined, a bias estimator may be run. An estimator is a rule for calculating an estimate of a given quantity based on observed data and a bias, or bias function, of the estimator is the difference between the estimator's expected value and the true value of the parameter being estimated. Thus, the bias estimator, according to this embodiment, may find data points that are related to each other and pull them together, thereby reducing errors in the data. The aim of the bias estimator is to move, or adjust, the data points, i.e. the determined positions, and remove GNSS errors. This may be performed by determining cost maps for all features and then trying to minimize the cost by adding a piece wise linear bias to all data. As previously described, the estimated positions of the at least one robotic work tool 100 may be adjusted in accordance with the positions for the determined features. As the positions of the robotic work tool 100 are continuous in time, points that are close to each other in time may be connected with the wheel odometry. When the bias estimator corrects one data point that is outside the boundary map, all other points close to that point will also be moved.

Figure 5:
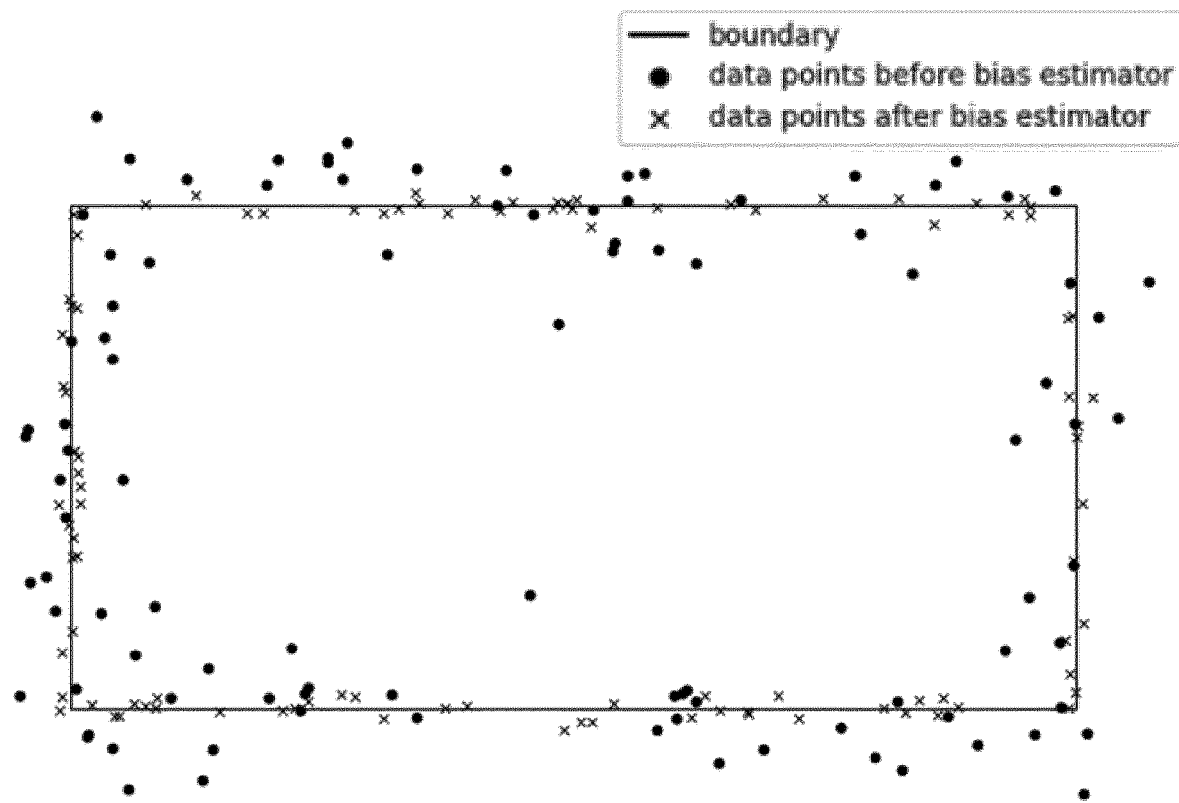
FIG. 5 shows an example embodiment of a determined map.

FIG. 5 illustrates an example when bias estimation has been used. The square in FIG. 5 illustrates a boundary of a working area 105. The dots, which are scattered around the boundary, represent uncorrected points, i.e. the point before the bias estimation is performed. Since many of the points are located outside the boundary map, the bias estimator will try to move them to be included, i.e. inside, in the working area 105. All other points, which are close in time, will then also be adjusted. Based on the adjusted positions of the determined features, a map defining the working area 105 may be determined. The crosses illustrate the data points after the bias estimator is performed. Thus, the data points illustrated as crosses in FIG. 5 illustrate the adjusted points. All feature maps previously described may be used as inputs for the bias estimator, not only the boundary map.

In some embodiments, the at least one controller 210 may be configured to repeat the steps of determining features reflecting the working area 105 and adjusting the determined positions, but based on the previously adjusted positions. Thus, the at least one controller 210 may be configured to determine features reflecting the working area 105 by relating the adjusted positions with each other based on the associated event data; and then adjust the determined positions based on the determined features by, for each determined feature, comparing the respective determined positions with each other. These steps may be repeated several times. However, it is generally preferred to repeat the bias estimation twice, as further repetitions typically only give minor improvements. If the robotic work tool system 200 presented herein is going to be described in a simplified way in accordance with these embodiments, the at least one controller 210 may be described as being configured to receive data. Based on the received data, positions may be determined. The positions may be determined based on, for example, wheel odometry data, position data and IMU data. Based on events and received sensor data, features reflecting the working area 105 may be determined. The determined positions may be adjusted based on the previously determined features, for example by bias estimation. Thereafter, the step of determining features may be repeated, but based on the adjusted positions. Then, the determined positions may be adjusted once again based on the newly determined features. Finally, a map may be determined.

In some embodiments, the at least one controller 210 may further be configured to control, based on the determined map, an operation of at least one robotic work tool 100 when operating within the working area 105. It may be appreciated that the robotic work tool 100, which operation may be controlled based on the determined map, does not have to be the same robotic work tool 100, which the received sensor data and event data relate to. The at least one controller 210 may be configured to receive sensor data and event data relating to at least one robotic work tool 100 and may be configured to control the operation of other robotic work tools 100. However, it may be appreciated that the at least one robotic work tool 100, which the sensor data and event data relates to, may be the same at least one robotic work tool 100 that is controlled by the at least one controller 210.

The at least one controller 210 may be configured to control the operation of the at least one robotic work tool 100 in several different ways. According to one example embodiment, the at least one controller 210 may be configured to determine, based on the determined map relating to the working area 105, a travel path within the working area 105 which the at least one robotic work tool 100 is intended to follow when operating within the working area 205. According to another example embodiment, the at least one controller 210 may be configured to determine travel patterns for a plurality of robotic work tools 100, which are intended to operate the working area 105 simultaneously. This may be used to, for example, ensure that the complete working area 105 is operated, or if the plurality of robotic work tools 100 should operate different parts of the working area 105.

In some embodiments, the at least one controller 210 may further be configured to transmit the determined map to at least one of the robotic work tool 100 and a visualization unit. Alternatively, or additionally, the at least one controller 210 may further be configured to transmit the travel path to at least one of the robotic work tool 100 and a visualization unit.

In some embodiments, the robotic work tool system 200 may comprise a visualization unit. The visualization unit may be configured to display the determined map relating to the working area 105. FIG. 2 illustrates an example of a robotic work tool system 200 comprising a visualization unit 230. In FIG. 2, the visualization unit 230 is illustrated as being located in the same device as the at least one controller 210. However, it may be appreciated that the visualization unit 230 may be located in another device, separated from the at least one controller 210. In one embodiment, the visualization unit 230 may be configured to receive user input from a user during the user's operation and interaction with said visualization unit 230, wherein the at least one controller 210 may be configured to adjust the map relating to the working area 105 based on the received user input.

Figure 6:
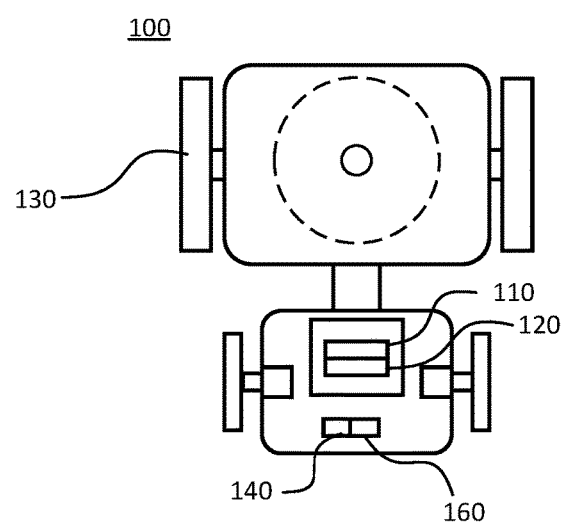
FIG. 6 shows a schematic overview of a robotic work tool.

As previously described, the robotic work tool system 200 may comprise the robotic work tool 100. An example of a robotic work tool 100 is exemplified in FIG. 6. The robotic work tool 100 may be, for example, a robotic lawnmower. FIG. 6 shows a robotic work tool 100 having a body and a plurality of wheels 130. The wheels 130 of robotic work tool 100 are to illustrate that the robotic work tool 100 is movable. In other embodiments, the wheels 130 may be embodied as, for example, caterpillar threads. The robotic work tool 100 may comprise a controller 110, such as a processor, configured to control the operation of the robotic work tool 100. The robotic work tool 100 may further comprise a memory 120, or computer readable medium, which is configured to carry instructions that when loaded into the controller 110 control the operation of the robotic work tool 100.

As also illustrated in FIG. 6, the robotic work tool 100 comprises at least one sensor unit 140. The sensor unit 140 may be configured to receive data for pose estimation of the robotic work tool 100. The sensor unit 140 may comprise a position unit configured to receive position data or a positioning signal. The position unit may comprise a satellite signal receiver, which may be a Global Navigation Satellite System (GNSS) satellite signal receiver. An example of such a system is Global Positioning System (GPS). The position unit may be configured to use, for example, Real-Time Kinematic, RTK, positioning. In advantageous embodiments, the at least one position unit may use RTK-GNSS positioning. A RTK-GNSS system is based on satellite communication. The at least one sensor unit 140 may be connected to the at least one controller 210 of the robotic work tool system 200 for enabling the controller 210 to estimate and determine poses of the robotic work tool 100.

In some embodiments, the at least one sensor unit 140 may further comprise a deduced reckoning navigation sensor for providing signals for deduced reckoning navigation, also referred to as dead reckoning. Examples of such deduced reckoning navigation sensors are odometers, IMUs and compasses. These may comprise, for example, wheel tick counters, accelerometers and gyroscopes. Additionally, visual odometry may be used to strengthen the dead reckoning accuracy further.

The robotic work tool 100 may further comprise at least one event unit 160. The at least one event unit 160 may be configured to collect sensed event data. The collected sensed input data may represent events of the robotic work tool 100. The at least one event unit 160 may be configured to collect the sensed input data while the robotic work tool 100 is moving within the working area 105. The collected sensed event data may be obtained, by the at least one event 160 continuously or when something happens to the robotic work tool 100. The collected event data may for example be, without limitations, loop data, timer data, load data, position data, collision data etc.

For example, the at least one event unit 160 may comprise a collision sensor. The collision sensor may be configured to detect a collision when the robotic work tool 100 is caused to move within the working area 105. Information of a detected collision may be communicated to the at least one controller 210. The collision sensor 160 may be configured to detect a direction of a movement of the chassis with respect to the body of the robotic work tool 100. The movement is indicative of a collision. The movement may also be indicative of a lift of the robotic work tool 100. Accordingly, the collision sensor may detect a direction of a movement in any direction.

The robotic work tool system 200 presented herein provides a way of determining a map, which accurately defines a working area 105 in a reliable and cost efficient way. The robotic work tool system 200 makes it possible to determine the map defining the working area 105 based solely on sensor data and event data related to at least one robotic work tool 100 moving within the working area 105 to be defined. Thus, the provided robotic work tool system 200 may determine an accurate map of a working area 105, based on relatively simple data.

According to a second aspect, there is provided a method implemented in the robotic work tool system 200 according to the first aspect. The method will be described with reference to FIG. 7.

Figure 7:
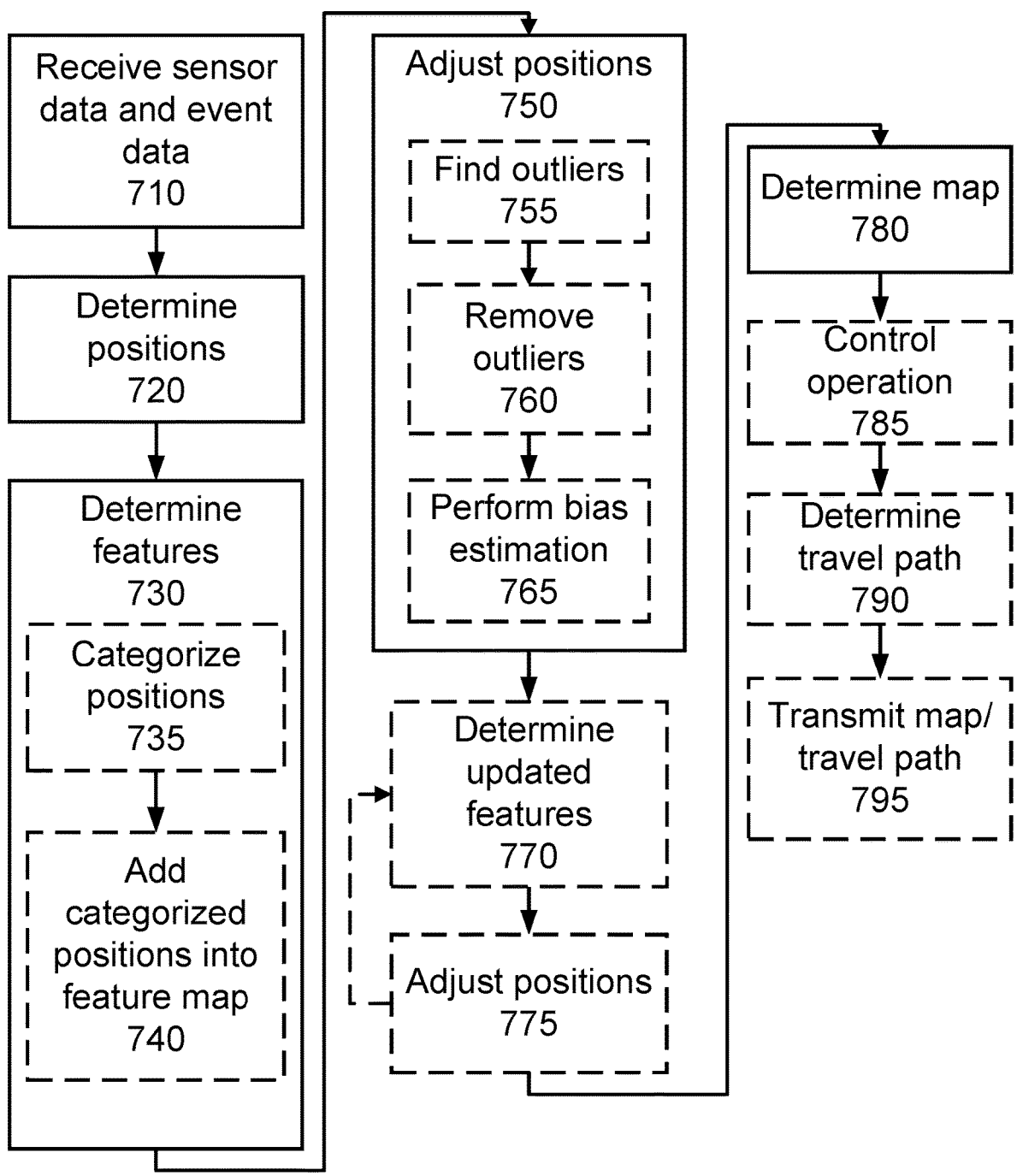
FIG. 7 shows a flowchart of an example method performed by a robotic work tool system.

In one embodiment, the method 700 may be performed by a robotic work tool system 200 for defining a working area 105 in which at least one robotic work tool 100 subsequently is intended to operate. As illustrated in FIG. 7, the method 700 starts with step 710 of receiving sensor data for pose estimation and event data relating to a plurality of events of at least one robotic work tool 100 moving within the working area 105. The received sensor data and event data are associated with each other in time. The received sensor data may comprise at least one of position data, IMU data and odometry data. The event data relating to the events of the at least one robotic work tool 100 may comprise loop events, timer events and state events.

The method 700 continues with step 720 of determining positions for the plurality of events based on the received sensor data associated with the respective event data. Thereafter, the method 700 continues with step 730 of determining features reflecting the working area 105 by relating positions associated with corresponding events with each other. This step 730 may further comprise step 735 of categorizing, based on the received event data, the determined positions into different categories, and step 740 of, for each category, adding the determined positions into a feature map. The feature map may correspond to the respective feature.

After features reflecting the working area 105 has been determined, the method 700 continues with step 750 of adjusting the positions of the determined features by, for each determined feature, comparing the respective determined positions with each other. The step 750 of adjusting the positions of the determined features may further comprise step 755 and step 760. Step 755 comprises finding outliers of the determined positions and step 760 comprises removing the found outliers from the determined positions of the determined feature. Additionally, or alternatively, the method 700 may further comprise step 765 of performing a bias estimation. According to some embodiments, the method further comprises step 770 and 775. Step 770 comprises determining updated features reflecting the working area 105 by relating the adjusted positions with each other based on the associated event data. Step 775 comprises adjusting the positions of the determined features by, for each determined feature, comparing the respective determined positions with each other. These two steps, step 770 and 775 may, according to some embodiments, be repeated a plurality of times.

When the positions of the determined features have been adjusted, the method 700 continues with step 780 of determining, based on the adjusted positions of the determined features, a map defining the working area 105.

According to some embodiments, the method 700 may further comprise step 785 of controlling, based on the determined map, an operation of at least one robotic work tool 100 operating within the working area 105. The step 785 of controlling an operation of at least one robotic work tool 100 may, for example, comprise step 790 of determining, based on the determined map defining the working area 105, a travel path within the working area 105 which the at least one robotic work tool 100 is intended to follow when operating within the working area 105.

In some embodiments, the method 700 may further comprise step 795 of transmitting the determined map and/or the travel path to at least one of the robotic work tool 100 and a visualization unit.

Figure 8:
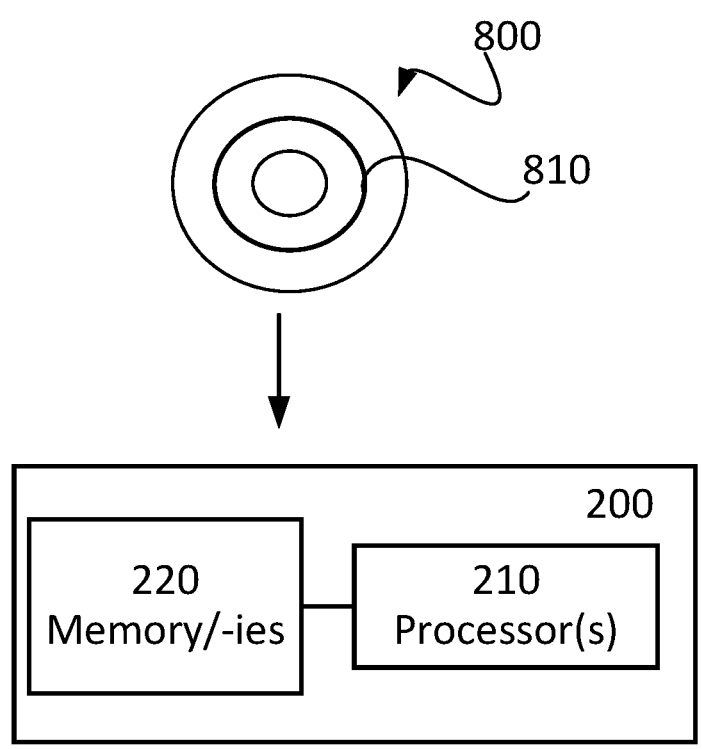
FIG. 8 shows a schematic view of a computer-readable medium.

With the proposed method 700 it may be possible to determine a map, which accurately defines a working area 105 in a reliable and cost efficient way. The method 700 makes it possible to determine the map defining the working area 105 based solely on sensor data and event data related to at least one robotic work tool 100 moving within the working area 105 to be defined. Thus, the provided method 700 may determine an accurate map of a working area 105, based on relatively simple data FIG. 8 shows a schematic view of a computer-readable medium which is configured to carry instructions 810 that when loaded into a controller, such as a processor, execute a method or procedure according to the embodiments disclosed above. The computer-readable medium 800 is in this embodiment a data disc 800. In one embodiment, the data disc 800 is a magnetic data storage disc. The data disc 800 is arranged to be connected to or within and read by a reading device, for loading the instructions into the controller. One such example of a reading device in combination with one (or several) data disc(s) 800 is a hard drive. It should be noted that the computer-readable medium can also be other mediums such as compact discs, digital video discs, flash memories or other memory technologies commonly used. In such an embodiment, the data disc 800 is one type of a tangible computer-readable medium 800.

The instructions 810 may also be downloaded to a computer data reading device, such as the controller 210 or other device capable of reading computer coded data on a computer-readable medium, by comprising the instructions 810 in a computer-readable signal which is transmitted via a wireless (or wired) interface (for example via the Internet) to the computer data reading device for loading the instructions 810 into a controller. In such an embodiment, the computer-readable signal is one type of a non-tangible computer-readable medium 800.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc. Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. Still further, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

The invention claimed is:

1. A robotic work tool system for defining a working area in which at least one robotic work tool subsequently is intended to operate, wherein the robotic work tool system comprises at least one controller being configured to:
   receive sensor data for pose estimation and event data relating to a plurality of events of at least one robotic work tool moving within the working area, wherein the received sensor data and received event data are associated with each other in time;
   determine positions for the plurality of events based on the received sensor data associated with the received event data;
   determine features reflecting the working area by relating positions associated with corresponding events with each other;
   adjust the determined positions based on the determined features by, for each determined feature, comparing the respective determined positions with each other;
   determine, based on the adjusted positions of the determined features, a map defining the working area;
   categorize, based on the received event data, the determined positions into different categories based on methods of collection of the received event data;
   for each category, add the determined positions into a feature map, wherein the feature map corresponds to a respective feature,
   compare a set of feature maps, which include each instance of the feature map for each category, to one another, and
   adjust the set of feature maps based on comparing the set of feature maps,
   wherein the at least one controller further is configured to control, based on the determined map, an operation of at least one robotic work tool operating within the working area.

2. The robotic work tool system according to claim 1, wherein the sensor data for pose estimation and the event data are received from the at least one robotic work tool moving within the working area.

3. The robotic work tool system according to claim 1, wherein the at least one controller is configured to control the operation of the at least one robotic work tool by:
  determining, based on the determined map relating to the working area, a travel path within the working area which the at least one robotic work tool is intended to follow when operating within the working area.

4. The robotic work tool system according to claim 3, wherein the at least one controller is further configured to:
  transmit the determined map and/or the travel path to the at least one robotic work tool and a visualization unit.

5. The robotic work tool system according to claim 1, wherein the at least one controller is configured to adjust the determined positions of the determined features by finding outliers of the determined positions and removing the found outliers from the determined positions of the determined features.

6. The robotic work tool system according to claim 1, wherein the at least one controller is configured to adjust the determined positions by bias estimation.

7. The robotic work tool system according to claim 1, wherein the received sensor data for pose estimation comprises at least one of position data, IMU data and odometry data.

8. The robotic work tool system according to claim 1, wherein the event data relating to the events of the at least one robotic work tool comprises loop events, timer events and state events.

9. The robotic work tool system according to claim 1, wherein, prior to determining the map relating to the working area, the at least one controller further is configured to:
  determine features reflecting the working area by relating the adjusted positions with each other based on the associated event data; and
  adjust the determined positions based on the determined features by, for each determined feature, comparing respective determined positions with each other.

10. The robotic work tool system according to claim 1, wherein the robotic work tool system comprises the at least one robotic work tool.

11. The robotic work tool system according to claim 1, wherein the at least one robotic work tool is a robotic lawn mower.

12. The robotic work tool system according to claim 1, wherein the robotic work tool system comprises a visualization unit and wherein the visualization unit is configured to display the determined map relating to the working area.

13. The robotic work tool system according to claim 12, wherein the visualization unit is configured to receive user input from a user during the user's operation and interaction with said visualization unit, wherein the at least one controller is configured to adjust the map relating to the working area based on the received user input.

14. A method, performed by a robotic work tool system, for defining a working area in which at least one robotic work tool subsequently is intended to operate, wherein the method comprises:
  receiving sensor data for pose estimation and event data relating to a plurality of events of the at least one robotic work tool moving within the working area, wherein the received sensor data and received event data are associated with each other in time;
  determining positions for the plurality of events based on the received sensor data associated with the received event data;
  determining features reflecting the working area by relating positions associated with corresponding events with each other;
  adjusting the positions of the determined features by, for each determined feature, comparing respective determined positions with each other;
  determining, based on the adjusted positions of the determined features, a map defining the working area;
  categorizing, based on the received event data, the determined positions into different categories; and
  for each category, adding the determined positions into separate feature maps, wherein each instance of the separate feature maps corresponds to a respective feature,
  wherein the at least one controller further is configured to control, based on the determined map, an operation of at least one robotic work tool operating within the working area,
  wherein, prior to determining the map relating to the working area, the at least one controller further is configured to:
  determine additional features reflecting the working area by relating the separate feature maps with each other based on the associated event data; and
  adjust the separate feature maps based on the additional features based on, for each additional feature, comparing respective separate features maps with each other.

15. A robotic work tool system for defining a working area in which at least one robotic work tool subsequently is intended to operate, wherein the robotic work tool system comprises at least one controller being configured to:
  receive sensor data for pose estimation and event data relating to a plurality of events of at least one robotic work tool moving within the working area, wherein the received sensor data and received event data are associated with each other in time;
  determine positions for the plurality of events based on the received sensor data associated with the received event data;
  determine features reflecting the working area by relating positions associated with corresponding events with each other;
  adjust the determined positions based on the determined features by, for each determined feature, comparing the respective determined positions with each other;
  determine, based on the adjusted positions of the determined features, a map defining the working area;
  categorize, based on the received event data, the determined positions into different categories based on methods of collection of the received event data; and
  for each category, add the determined positions into a feature map, wherein the feature map corresponds to a respective feature,
  wherein the robotic work tool system comprises a visualization unit configured to display the determined map relating to the working area,
  wherein the visualization unit is configured to receive user input from a user during the user's operation and interaction with said visualization unit to adjust the feature map,
  wherein the at least one controller is configured to adjust the map relating to the working area based on the received user input, and
  wherein the at least one controller further is configured to control, based on the determined map, an operation of at least one robotic work tool operating within the working area.

* * * * *